United States Patent [19]

Aymerich et al.

[11] Patent Number: 5,355,254

[45] Date of Patent: Oct. 11, 1994

[54] SEMIAUTOMATIC OPENING AND CLOSING DEVICE FOR SUNVISOR MIRRORS HAVING A FOLD-DOWN COVER

[75] Inventors: José Aymerich; Jesûs Prat, both of Rubi, Spain

[73] Assignee: Industrias Techno-Matic S.A., Barcelona, Spain

[21] Appl. No.: 915,703

[22] Filed: Jul. 22, 1992

[30] Foreign Application Priority Data

Dec. 21, 1990 [ES] Spain ............... P9003267

[51] Int. Cl.$^5$ .............. G02B 7/18; B60J 3/02; E05D 11/10; E05F 1/14

[52] U.S. Cl. ............... 359/844; 296/97.5; 16/295

[58] Field of Search ........... 359/844, 871, 872, 879; 362/135, 136, 137, 142, 143, 144; 296/97.1, 97.5, 97.6, 97.9; 16/293, 294, 295

[56] References Cited

U.S. PATENT DOCUMENTS

| | | | |
|---|---|---|---|
| 3,926,470 | 12/1975 | Marcus | 359/844 |
| 4,421,355 | 12/1983 | Marcus | 362/144 |
| 4,491,899 | 1/1985 | Fleming | 296/97.5 |
| 4,655,498 | 4/1987 | Panzner et al. | 296/97.5 |
| 4,909,562 | 3/1990 | Sakuma et al. | 296/97.5 |
| 4,981,348 | 1/1991 | Prillard | 362/136 |
| 5,022,699 | 6/1991 | Yoshida | 362/144 |
| 5,059,016 | 10/1991 | Lawassoni et al. | 359/844 |
| 5,061,004 | 10/1991 | Happich et al. | 359/872 |

FOREIGN PATENT DOCUMENTS

| | | | |
|---|---|---|---|
| 0261989 | 3/1988 | European Pat. Off. | 296/97.5 |
| 2318045 | 2/1977 | France . | |
| 0231238 | 9/1990 | Japan | 296/97.5 |
| 276352 | 12/1983 | Spain . | |
| 276353 | 12/1983 | Spain . | |
| 892370 | 3/1962 | United Kingdom . | |

*Primary Examiner*—Ricky D. Shafer
*Attorney, Agent, or Firm*—Michael J. Striker

[57] ABSTRACT

A sunvisor mirror comprises a casing having opposite sides, a cover rotatable about an axis of rotation relative to the casing, an opening and closing device including two identical holding springs arranged in the interior of the casing, one on each of the sides and close to the axis of rotation of the cover, each of the holding springs being attached to the casing and the cover, retaining members attaching the holding springs to the casing and the cover so that one end of the holding springs is hooked in the casing and the other of the holding springs acts on the cover so that from an intermediate position of a rotary path of the cover two opposite automatic directions of rotation of the cover which are an opening direction and a closing direction are provided.

2 Claims, 2 Drawing Sheets

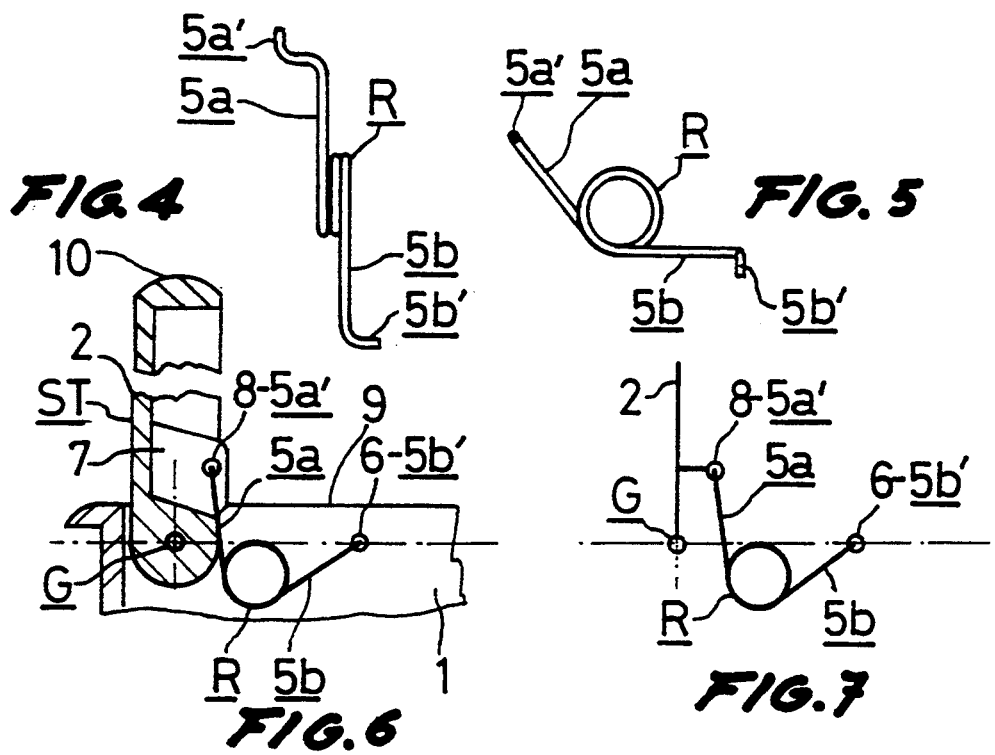
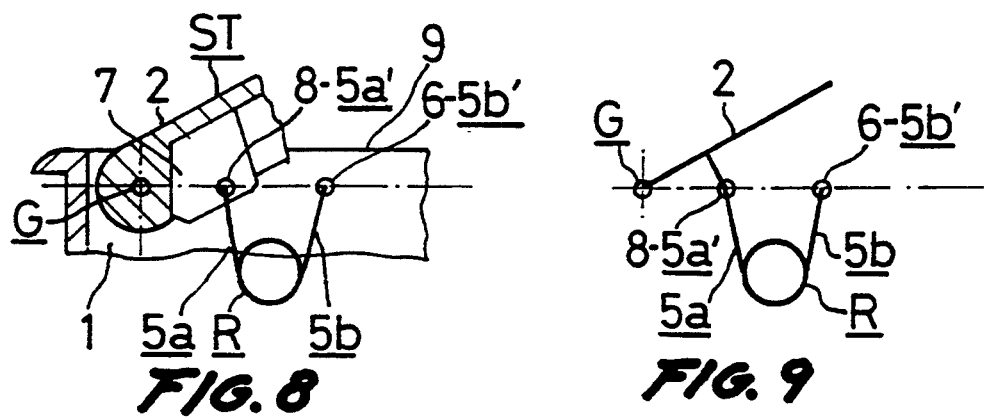
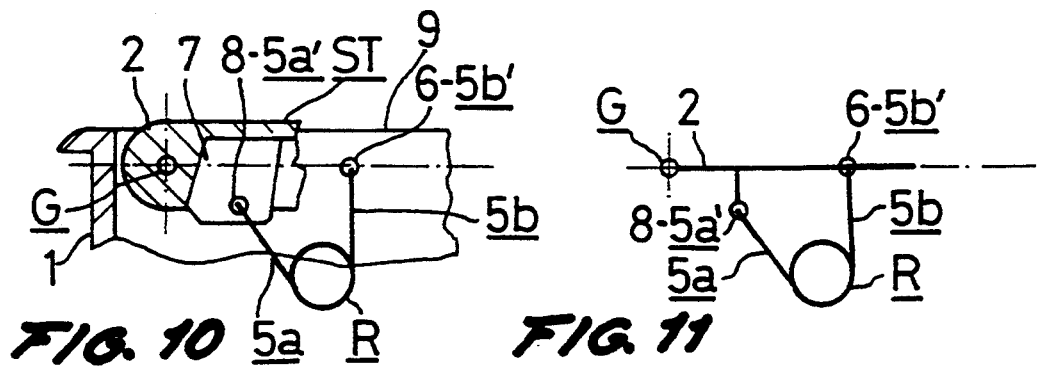

SEMIAUTOMATIC OPENING AND CLOSING DEVICE FOR SUNVISOR MIRRORS HAVING A FOLD-DOWN COVER

FIELD OF THE INVENTION

The object of the present invention is a semiautomatic opening and closing device for sunvisor mirrors having a fold-down cover which, in particular, is applicable to automobile sunvisor mirrors of modular structure.

BACKGROUND OF THE INVENTION

It is well known that in automobiles, the passenger side sunvisor is provided as original equipment with a mirror, generally known as a vanity mirror said sunvisor is of modular construction, said vanity mirror usually basically comprises an essentially prismatic casing and a cover which may be opened and closed at will by the user.

The mirror casing is dimensioned to contain the mirror surface as such and the means and/or devices intended for increasing the functionality of the mirror, such as may be, among other regularly used ones, means for illuminating the immediate surroundings of said mirror. The purpose of the cover is to conceal the mirror surface housed in the casing to conserve its reflective properties by preventing deterioration thereof by action of the environment.

Where the cover is attached to the prismatic casing of the mirror in such a way that said cover may be pivoted, the mirror requires means and/or devices holding the cover in the positions in which the mirror surface is concealed and/or open to view.

Sunvisor vanity mirrors having a hingedly attached cover are disclosed in Spanish utility models nos. 276,352 for "Parasol perfeccionado para vehículos automóviles" and 276,353 for "Parasol mejorado para vehículos automóviles". Both said utility models are differentiated by the respective means used for holding the cover in the concealment position. Utility model 276,352 bases the holding of the cover in the concealment position on the action of a mechanical pressure closing means, while utility model 276,353 bases said holding on a magnetic closing means.

In general, the known vanity mirrors having a hingeable cover suffer, among others, from the following drawbacks: the means holding the cover in the concealment and/or open to view positions of the mirror surface comprise a high number of expensive to make and assemble components, which consequently makes the end product more expensive; the said holding means are of limited reliability as far as retaining the cover in the said positions is concerned, being a frequent cause of untimely detachment of the cover; and the manual operation of the said means also relatively frequently involves a deformation and/or breakage of the mirror components.

SUMMARY OF THE INVENTION

With a view to providing an economical and highly operatively reliable solution to the problems affecting the positional holding and operation by the user of the cover for vanity mirrors incorporated in modular structure sunvisors, a semiautomatic opening and closing device for sunvisor mirrors having a fold-down cover is disclosed.

The semiautomatic opening and closing device of the invention is characterized in that it is composed of two identical holding springs arranged in the interior of the mirror casing, one on each of the short sides thereof, close to the corresponding axis of rotation. Said holding springs, which are each attached to the casing and to the cover of the mirror by way of corresponding retaining means, are permanently under torque with one of the respective ends thereof hooked in the casing and the other respective end acting on the cover, so that from an intermediate position of the possible rotary path of the cover two opposite automatic directions of rotation of the cover, which are the opening and the closing directions, are determined.

The semiautomatic opening and closing device of the invention is also characterized in that the retaining means attaching the holding springs to the mirror casing and cover include two mutually opposite hooking orifices in the sides of the mirror casing transverse to the axis of rotation of the cover, at a relatively short distance from said axis of rotation, in each of which orifices there is hooked one end of the corresponding holding spring, which ends may rotate freely in their place of hooking; and also include two mutually opposite thrust orifices in the sides of the mirror cover transverse to the axis of rotation, each of which orifices houses the other end of the corresponding holding spring, which ends may rotate freely in their housing, with the condition that the virtual longitudinal axis defined by said thrust orifices is at a greater distance from outer surface of the cover than the longitudinal axis of rotation of said cover, and with the condition that the said virtual longitudinal axis is at a smaller distance from the front edge of the cover than the longitudinal axis of rotation thereof.

The small number of component parts of the semiautomatic opening and closing device for sunvisor mirrors having a fold-down cover of the invention, as well as the extraordinary simplicity of manufacture and assembly of these components are essential factors as far as production costs are, in general, concerned. Because of its characteristic structure, the device also affords high operative reliability which, under the normal conditions of use of the vanity mirror, prevent the untimely detachment of the cover in either of the two stable positions thereof, i.e. of concealment or open to view position of the mirror surface.

The operation of the semiautomatic opening and closing device of the invention is extremely simple and prevents the user from subjecting the vanity mirror components, under nominal conditions of use when concealing and revealing the mirror surface, to mechanical overloads which may cause a deformation and/or breakages of the said mirror components.

The holding springs are always working under torque as described above. Therefore the device of the invention works in such a way that, when the cover is in the mirror surface concealment position, to uncover the surface the user has only to apply to the front edge of the cover a force sufficient to overcome the action of the holding springs and cause it to rotate over a relatively small distance until, on reaching a particular intermediate position, relatively close to the concealment position, the manually started rotation continues automatically under the action of the holding springs until the intended position in which the mirror surface is uncovered and may be used by the user is attained.

Contrarywise, i.e. when the mirror surface is uncovered, to conceal said surface, the user, similarly to the way described above, has to apply a force to the front edge of the mirror overcoming the force of the holding springs and cause it to rotate to the said intermediate position, as from which the cover, under the action of the holding springs will automatically continue the manually started rotation until the position in which the mirror surface is concealed is attained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The semiautomatic opening and closing device for sunvisor mirrors having a fold-down cover of the invention is illustrated in the sheets of drawings accompanying this description. In the drawings:

FIG. 4 is a front view of a holding spring of the device of the invention.

FIG. 5 is a side view of a holding spring of the device of the invention.

FIG. 6 is a part view of the mirror in cross section, showing the device of the invention, with the mirror cover in the open position.

FIG. 7 is a schematical view of the operation of the device of the invention of FIG. 6.

FIG. 8 is a part view of the mirror in cross section, showing the device of the invention, with the mirror cover in an intermediate position.

FIG. 9 is a schematical view of the operation of the device of the invention of FIG. 8.

FIG. 10 is a part view of the mirror in cross section, showing the device of the invention, with the mirror cover in the mirror surface concealing position.

FIG. 11 is a schematical view of the operation of the device of the invention of FIG. 10.

DESCRIPTION OF A PREFERRED EMBODIMENT

Figure 3:
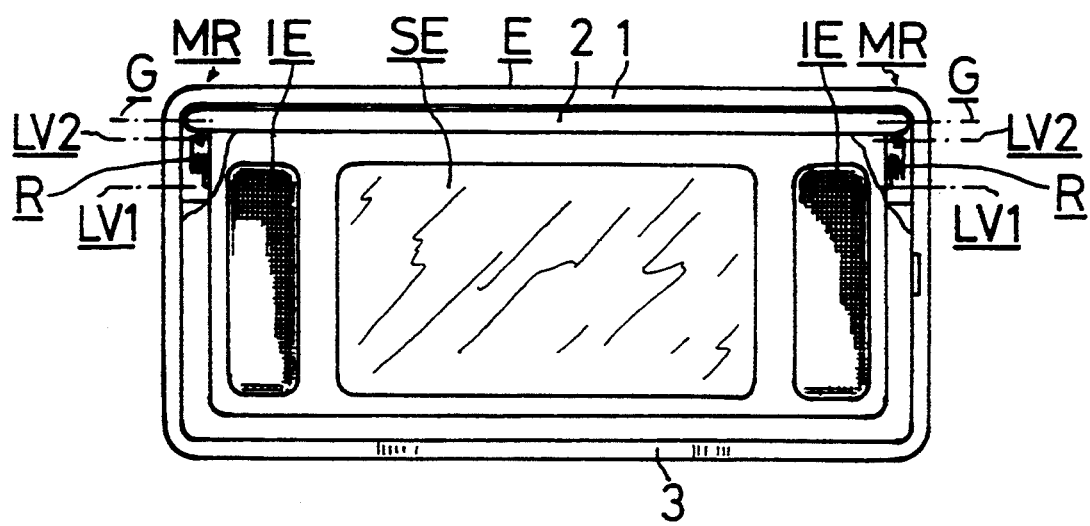
FIG. 3 is a front view of the sunvisor mirror having a fold-down cover showing the device of the invention.

The semiautomatic opening and closing device for sunvisor mirrors having a fold-down cover of the invention described as an example comprises, as shown in FIG. 3 of the drawing sheet, two holding springs R attached to the casing 1 and to the cover 2 of the mirror E by the retaining means MR. The holding springs R and the retaining means MR are arranged symmetrically about the transverse axis of the mirror E.

The mirror E may be integrated in a modular structure sunvisor which, for clarity of description, has not been shown in the drawing sheets.

Figure 1:
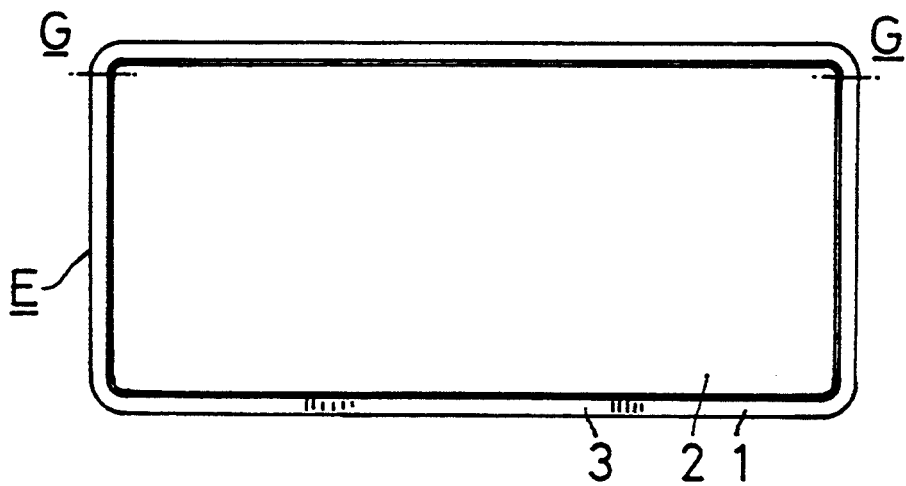
FIG. 1 is a front view of the sunvisor mirror having a fold-down cover.
Figure 2:
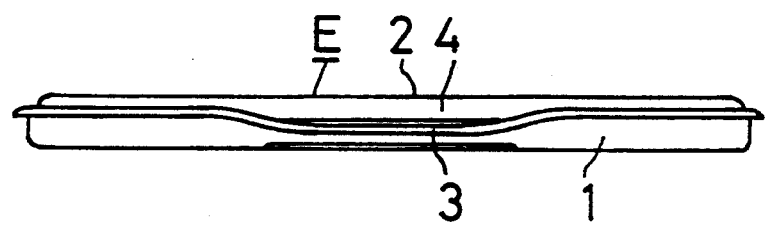
FIG. 2 is a side view of the mirror illustrated in FIG. 1.

As shown in FIGS. 1 and 2, the casing 1 of the mirror E is essentially prismatic in shape and in this embodiment is dimensioned to house, further to the mirror surface SE, the means IE for electrically illuminating the immediate surroundings of the mirror E, said means IE being shown in FIG. 3. Obviously, the mirror E casing 1 may be dimensioned to house, further to the said mirror surface ES, any other means and/or device for increasing the services or functionality of the mirror E.

FIGS. 1 and 3 show how the casing 1 and the cover 2 of the mirror E are provided with the corresponding means enabling the cover 2 to rotate about itself on the axis of rotation shown as G in said FIGS. 1 and 3, as well as in FIGS. 6 to 11. This means, for the same reasons as given above, have not been shown in the drawings.

FIG. 2 shows the casing 1 of the mirror E. It is formed, on the side opposite the one having the means allowing the rotation of the cover 2, with the recess 3 provided to facilitate for the user the operation of rotating the cover 2. The cover may thus be taken hold of with the front edge 4 thereof, so as to uncover the mirror surface SE.

FIGS. 4 and 5 show how each of the two holding springs R is provided at the respective ends thereof with the transverse extensions 5a and 5b which, in this embodiment, are of the same length. The extensions 5a and 5b are formed at the free ends thereof with respective bent terminations 5a' and 5b'.

FIG. 3 and, in detail, FIGS. 6, 8 and 9 show how the retaining means MR attach the holding springs R to the casing 1 and to the cover 2 of the mirror E and are arranged symmetrically to the transverse axis of the mirror E, as said above, at a short distance from the axis of rotation G.

The retaining means MR comprise at both said sides of the mirror E.

a through hooking orifice 6 on the casing 1, in which there is snugly housed the bent termination 5b' of the transverse extension 5b of the corresponding holding spring R. They also comprise the through thrust hole 8 on the perpendicular extension 7 formed on said cover 2 in this embodiment which snugly houses the bent termination 5a of the same holding spring R, both bent terminations 5a' and 5b' being able suitably to rotate in their respective housings defined by the through hooking orifice 6 and through thrust orifice 8 respectively.

FIGS. 6, 8 and 10 show how, in this embodiment, the virtual longitudinal axis, marked LV1 in FIG. 3, defined by the through hooking orifices 6 formed on both transverse sides of the casing 1 of the mirror E, and the longitudinal axis of rotation G are at the same distance from the upper edge 9 of said casing 1.

FIG. 6 shows how the virtual longitudinal axis, marked LV2 in FIG. 3, defined by the through thrust orifices 8 formed on both sides of the cover 2 of the mirror E, is arranged at a greater distance from the outer surface ST of the cover 2 and at a shorter distance from the front edge 10 of the cover 2 than the longitudinal axis of rotation G.

The semiautomatic opening and closing device for sunvisor mirrors having a fold-down cover of the invention operates as follows.

FIG. 6 and, schematically, FIG. 7 show how the cover 2 is in the open to view position of the mirror surface SE. Under these conditions, the holding springs R, which, independently of the position occupied by the cover 2, are constantly under tension as said above, while pressing against the casing 1 by means of the through hooking orifices 6, act on the cover 2 by way of the through thrust orifices 8. In this way, the holding springs R fix the open position of the mirror surface SE, preventing the normal vibrations generated by the vehicle while running from causing the mirror surface SE to be concealed by untimely folding down of the cover 2.

To conceal the mirror surface SE the user only has to apply a force in the pertinent direction on the front edge of the cover 2. The purpose of this force is to overcome the moment of rotation exerted by the holding springs R on the cover 2 and cause the latter to rotate to the position shown in FIG. 8 and schematically in FIG. 9. As from this position, it is no longer necessary for the user to continue exerting any pressure on the cover 2 since the action of the holding springs R, which reverse the moment of rotation applied thereby to the cover 2 relative to the preceding positions, automatically drives said cover 2 to the concealment position shown in detail in FIG. 10 and schematically in FIG. 11.

In this position, in which the mirror surface SE is concealed, in a similar way to the one described above, the action of the holding springs R prevents untimely opening of the cover 2.

For the cover 2 to move to the initial or open to view position of the mirror surface SE, the user only needs to apply a pressure to the front edge of the cover 2 in the corresponding direction. Said force is to overcome the pressure of the holding springs R to attain the position shown in detail in FIG. 8 and schematically in FIG. 9. From this position, in a similar way as described above, the user need not exert any further pressure on the cover 2, since the action of the holding springs R on the cover 2 will drive it automatically to the position shown in FIG. 6 and schematically in FIG. 7, where the above described initial situation, i.e. where the mirror surface SE is open to view, is attained.

It will be understood that each of the elements described above, or two or more together, may also find a useful application in other types of constructions differing from the types described above.

While the invention has been illustrated and described as embodied in a semiautomatic opening and closing device for sunvisor mirrors having a fold-down cover, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A sunvisor mirror, comprising:
 a casing having opposite sides and a mirror disposed therein;
 a cover rotatable about an axis of rotation relative to said casing;
 an opening and closing device including two identical holding springs arranged in the interior of said casing, one on each of said sides and close to said axis of rotation of said cover, each of said holding springs being attached to said casing and said cover;
 retaining means attaching said holding springs to said casing and said cover so that one end of said holding springs is hooked in said casing and the other of said holding springs acts on said cover so that said cover can be rotated from an intermediate position of a rotary path in two opposite automatic directions including an opening direction and a closing direction, said retaining means including two mutually opposite hooking orifices provided in said sides of said casing which are transverse to said axis of rotation of said cover at a distance from said axis of rotation, so that one end of said holding springs is hooked in each of said orifices and can rotate freely about said hooking orifices, two mutually opposite thrust orifices provided in the sides of said cover which are transverse to said axis of rotation so that the other end of each of said holding springs is housed in a respective one of said thrust orifices and can rotate freely in said cover such that a virtual longitudinal axis defined by said thrust orifices is at a greater distance from an outer surface of said cover than said longitudinal axis of rotation of said cover, and such that said virtual longitudinal axis is at a smaller distance from a front edge of said cover than said longitudinal axis of rotation of said cover.

2. A sunvisor mirror, comprising a casing having opposite sides and a mirror disposed therein;
 a cover rotatable about an axis of rotation relative to said casing;
 an opening and closing device including two identical holding springs arranged in the interior of said casing, one on each of said sides and close to said axis of rotation of said cover, each of said holding springs being attached to said casing and said cover;
 retaining means attaching said holding springs to said casing and said cover so that one end of said holding springs is hooked in said casing and the other of said holding springs acts on said cover so that said cover can be rotated from an intermediate position of a rotary path in two opposite automatic directions including an opening direction and a closing direction, said casing having two long sides and two short sides, said springs being arranged on said short sides of said casing, said retaining means including two mutually opposite hooking orifices provided in said short sides of said casing which are transverse to said axis of rotation of said cover at a distance from said axis of rotation, so that one end of said holding springs is hooked in each of said orifices and can rotate freely about said hooking orifices, two mutually opposite thrust orifices provided in the sides of said cover which are transverse to said axis of rotation so that the other end of each of said holding springs is housed in a respective one of said thrust orifices and can rotate freely in said cover such that a virtual longitudinal axis defined by said thrust orifices is at a greater distance from an outer surface of said cover than said longitudinal axis of rotation of said cover, and such that said virtual longitudinal axis is at a smaller distance from a front edge of said cover than said longitudinal axis of rotation of said cover.

* * * * *